United States Patent [19]

Moore

[11] 4,348,184

[45] Sep. 7, 1982

[54] LANDING LIGHT PATTERN GENERATOR FOR DIGITAL IMAGE SYSTEMS

[75] Inventor: Randy W. Moore, Cupertino, Calif.

[73] Assignee: The Singer Company, Binghamton, N.Y.

[21] Appl. No.: 203,913

[22] Filed: Nov. 4, 1980

[51] Int. Cl.$^3$ .............................................. G09B 9/08
[52] U.S. Cl. ...................................... 434/42; 340/729; 364/522; 434/43
[58] Field of Search ................... 434/42, 43; 364/522, 364/748; 340/729

[56] References Cited

U.S. PATENT DOCUMENTS

| | | | |
|---|---|---|---|
| 3,373,506 | 3/1968 | Davidoff | 434/42 |
| 3,602,702 | 8/1971 | Warnock | 364/522 |
| 3,621,214 | 11/1971 | Romney | 364/522 |
| 3,665,408 | 5/1972 | Erdahl et al. | 340/729 |
| 3,697,734 | 10/1972 | Booth et al. | 364/748 |
| 4,177,579 | 12/1979 | Peters et al. | 434/43 |
| 4,179,824 | 12/1979 | Marsh | 434/43 X |
| 4,213,252 | 7/1980 | Sullivan et al. | 434/43 |

*Primary Examiner*—William H. Grieb

*Attorney, Agent, or Firm*—Jeff Rothenberg; Douglas M. Clarkson

[57] ABSTRACT

A system is described for use in a simulator apparatus, particularly a simulator of an aircraft, whereby aircraft landing lights can be simulated effectively in a night scene. This is accomplished by increasing the illumination intensity of a part of each line across the screen, in accordance with a pattern generated for this purpose. The illumination intensity is increased in a manner unrelated to the objects in the scene; but rather, the scene that would be visible is made brighter where the landing lights would illuminate it.

In accordance with the disclosure, a counter circuit 48 initiates a bell shaped pattern and also a counter circuit 49 initiates an envelope pattern. The bell shaped pattern is the primary pattern for use in increasing the intensity of the illumination across each scanline, but the particular shape of the bell shaped pattern is modified, as required, by the envelope curve. The envelope pattern is combined with the bell pattern in circuit 59. The composite pattern is used in circuit 42 to combine with information concerning the position of the aircraft from circuit 39, and the lamp intensity on line 37, to increase the intensity along each scanline of the display.

7 Claims, 16 Drawing Figures

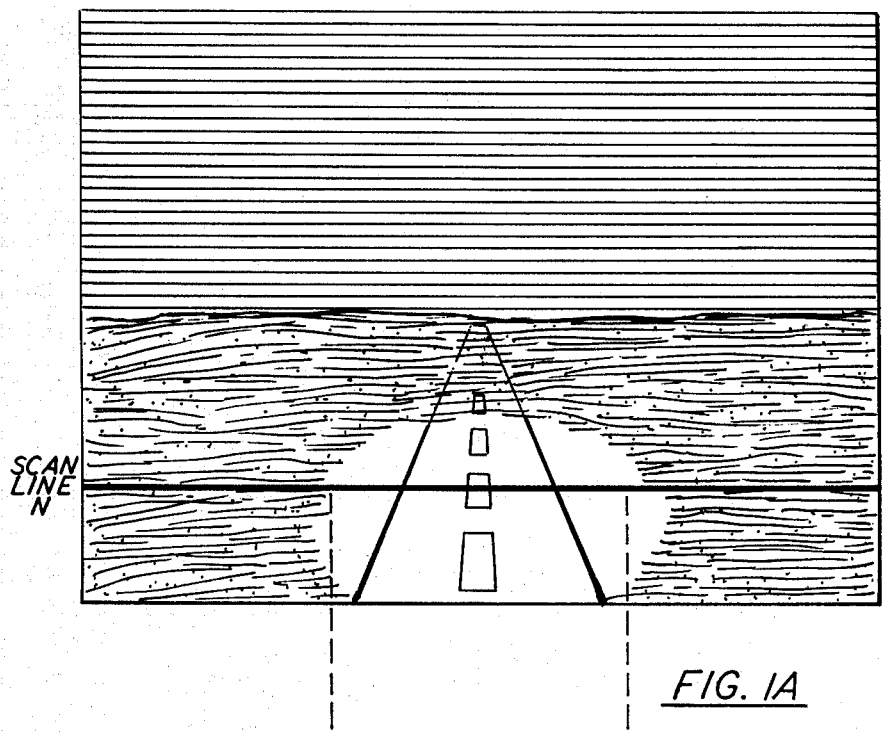
FIG. IA
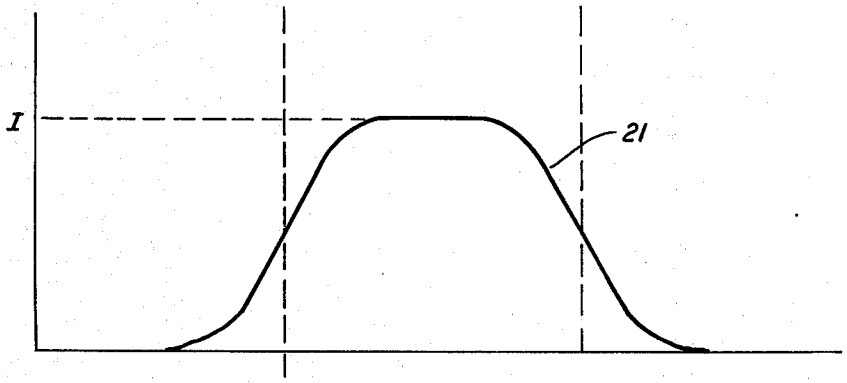
FIG. IB

LANDING LIGHT PATTERN GENERATOR FOR DIGITAL IMAGE SYSTEMS

The United States Government has rights in this invention pursuant to Contract Number F33657-77-C-0176 awarded by the Air Force.

BACKGROUND OF THE INVENTION

This invention, generally, relates to electronic systems and circuits for generating various scenes digitally in a continuously changing pattern and, more particularly, to a landing light pattern generator for use in flight simulators.

Since 1968, systems have been known for generating perspective images on a television screen. Such perspective images can be generated in real time for use in training applications such as pilot training, wherein the viewed image changes in response to the control actions of pilot in a flight simulator.

PRIOR ART

Examples of the prior art of the digital generation of perspective images are described in U.S. Pat. No. 3,602,702 to Warnock, U.S. Pat. No. 3,621,214 to Romney, and U.S. Pat. No. 3,665,408 to Erdahl. The digital systems disclosed in these prior art patents utilize such methods as point-by-point production of the perspective view, constructing the object from basic geometric models, and a line-by-line method of construction of images for such objects.

The systems described in these prior patents permit three-dimensional objects to be drawn electronically upon a cathode ray tube, but in the form disclosed, such systems are impractical for use in flight simulator apparatus. Simulator usage requires control over the visual scene in real time and, as such, had to await additional features.

Examples of additional features are described in U.S. Pat. No. 3,697,734 to Booth et al., U.S. Pat. No. 4,179,824 to Marsh, and U.S. Pat. No. 4,213,252 to Sullivan et al., each of which is assigned to the assignee of the present invention. The real time generation of perspective images for flight training is now an established art.

The simulation of the effects of landing lights for use with night scenes has also been accomplished in the prior art. Systems delivered to the U.S. Air Force for pilot training on the F-111 aircraft were designed and manufactured by the assignee and included a landing light pattern generator. The method employed in that design utilized a multiple integration process to generate increased intensities across the image scanlines so as to produce a bright pattern in the center of the image. The method provided an acceptable image for the particular application, but required computations of high precision and entailed a difficult method of adjustment to make the displayed pattern match that of the real aircraft. In addition, the design did not permit steering the pattern, as with a moveable lamp, nor did it incorporate the generation of patterns having two lobes horizontally.

INVENTION OBJECTS AND SUMMARY

It is a primary object of this invention to provide a new and improved arrangement for generating perspective images digitally.

It is also an object of the present invention to provide a new and improved arrangement for generating perspective images digitally which arrangement minimizes the shortcomings of previously known arrangements.

A more specific object of the present invention is to provide a new and improved landing light pattern generator for digital image systems in an aircraft simulator.

In accordance with a presently preferred form of the invention, the above and other objects are achieved in a system for developing a scene from information obtained from data generated for that purpose and from stored data, and the system having at least one display device to display the scene. The system includes data storage means and control means to generate data, the total being a composite scene depicted on a display device. Connected also to the display device, in accordance with the invention, is a means to vary the intensity of a portion of the displayed scene. By arranging the intensity pattern, an aircraft landing light illumination of the scene can be simulated realisticly.

DESCRIPTION OF THE DRAWINGS

Further objects, features and advantages of the present invention will become apparent more readily from the following detailed description taken in conjunction with the drawings, in which:

FIG. 1A illustrates pictorially the landing light pattern in a digitally generated scene through the use of landing light pattern generation in accordance with the present invention;

FIG. 1B depicts the illumination due to the landing light pattern generation along a particular scanline;

THEORY OF THE INVENTION

Figure 2:
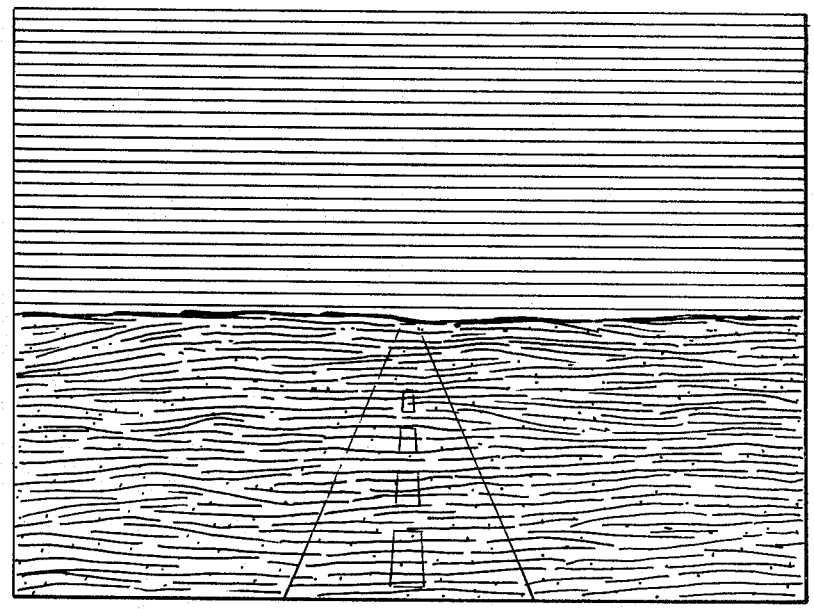
FIG. 2 illustrates the same scene as in FIG. 1A but without the landing lights of the invention.

To simulate the effects of landing lights in an image, the brightness of the image must be made to vary on the display in accordance with the beam pattern of the lamps mounted on the aircraft and with the position of the lamps with respect to the scene. Referring to FIG. 1 of the drawings, a runway image is depicted with the landing light illumination, showing a lamp pattern shape along with attenuation of the pattern at distances far from the pilot's viewpoint. In contrast, FIG. 2 depicts the scene without the landing light illumination effect; the scene is very dark, but uniformly illuminated.

Figure 3:
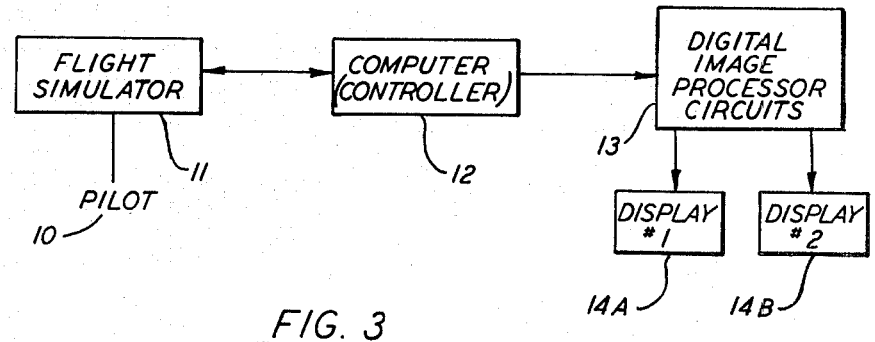
FIG. 3 is a circuit diagram in block form of the prior art arrangement without landing light simulation.

To produce the desired simulation of landing lights, a landing light pattern generator must be included in a simulation system. For example, FIG. 3 of the drawings illustrates a flight simulator system with visual capabilities provided by a digital visual system. A flight simulator 11 which is being used to train a pilot 10 is connected to a flight simulator computer (controller) 12 through an appropriate interface linkage, all of which is well known in the art. The flight simulator computer 12 is responsive to the pilot's maneuvering and control actions at the simulator controls. The flight computer 12 processes and acts upon all of the flight data from the simulated aircraft 11 and provides data to the digital image processor circuit 13.

The digital image processor circuit 13 responds to the data from the flight computer 12, and in particular to the aircraft's position and attitude, to generate images for the displays 14 and 15 to be viewed by the pilot 10.

When pattern generation hardware 16 is incorporated (FIG. 4) it is placed at or near the end of the image data processing circuits 13 and prior to the displays 14a, 14b. Note that the same image is presented to the two front displays 14, for the pilot and copilot. The landing lights generator always works to modify the signals representing the intensity of the processed image prior to display of the image, so the video intensity is the primary input to the generator. In addition, the landing lights generator requires synchronization signals to mark the start of the frame, the start of each scanline, and each picture element; and the generator requires control information to determine the position of the simulated light beam within the frame, the position of the horizon in the picture, and the attenuation of the beam due to altitude.

Figure 6:
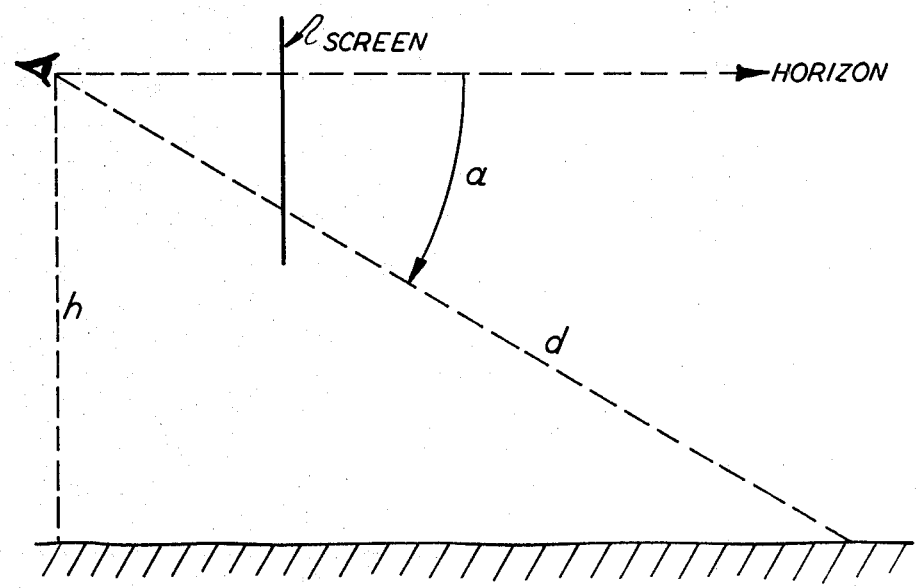
FIG. 6 is a diagram showing the line-of-sight of the horizon, the distance to the surface of the earth along a ray from the eyepoint, and the height of the line-of-sight above the surface.
Figure 5:
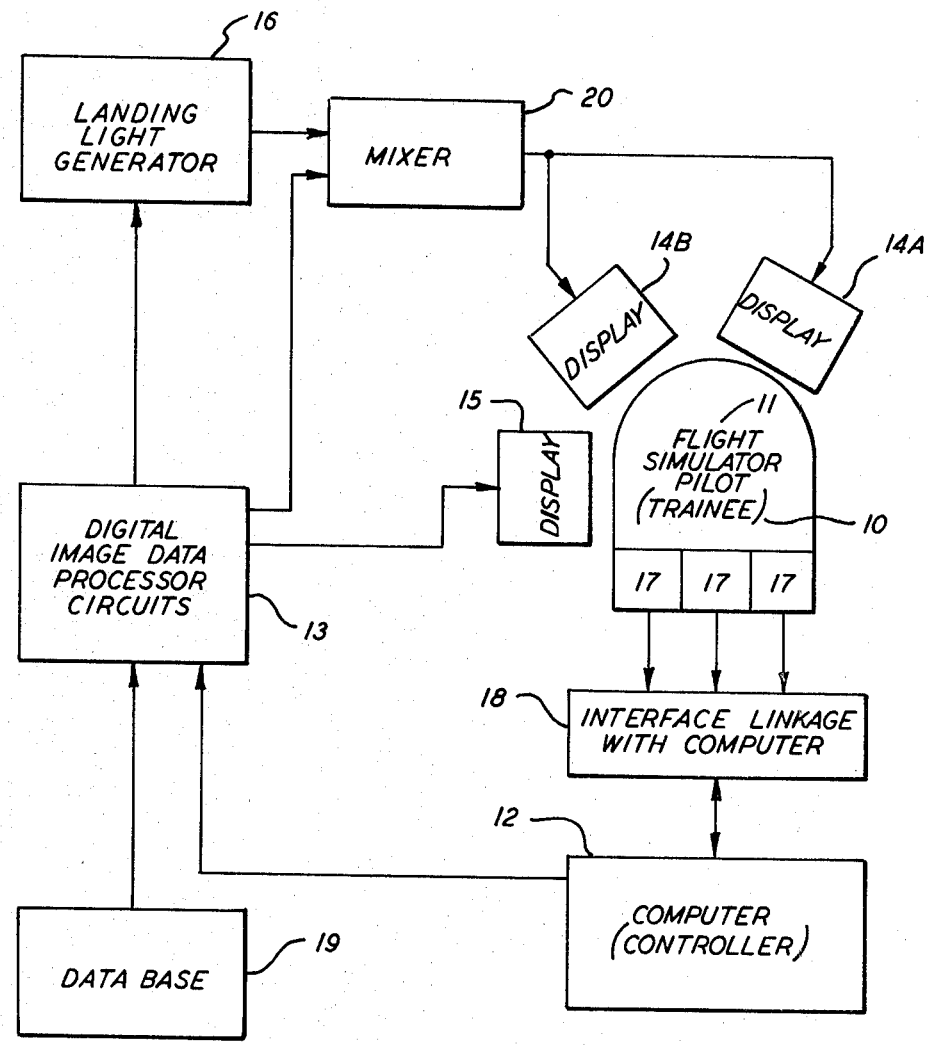
FIG. 5 is a circuit diagram, in block form, showing some of the physical relationships between the respective components.

The control signals work with the landing lights generator to modify the image according to a mathematical representation of the way in which real lamps illuminate a scene. Referring to FIG. 6, the path of a ray of light of length d is depicted between an eyepoint and the ground. The ray length d varies with respect to the horizon line parallel to the ground. Since the landing lights are generally a small fraction of d from the eyepoint, it is a satisfactory approximation to consider the illumination source to be coincident with the eyepoint for the simulation. The light intensity falls off as the square of the distance, so the intensity at the point on the ground will be $$L = \frac{P}{d^2} = \frac{P}{h^2/\sin^2(a)} = \frac{P\sin^2(a)}{h^2} \quad \text{(Eqn. 1)}$$

P=lamp intensity in the direction of the ray
L=light intensity on the ground
h=height of the eyepoint above the ground
a=angle of the ray from the horizontal The lamp intensity conribution to the scene illumination is, in the real world, added to the effects of other illumination sources.

In the pattern generator, the adding to the real world is simulated through the use of a mixer circuit which adds the pattern contribution to the incoming processed video. Ideally, the mixer will take into account the reflectivity of the individual surface objects, but in practice it has been found adequate just to brighten the image in proportion to the generated pattern brightness. However, it is possible to take into account directional characteristics of the reflecting surface during the actual generation of the pattern by using a function other than sine-squared for the generation. This is important because special reflective paints may be used for runway markings, so more of the light will be reflected back to the observer than otherwise would be expected; this makes the illumination I look brighter. This can be taken into account by using sine rather than sine-squared of the depression angle in the landing light generation.

Figure 4:
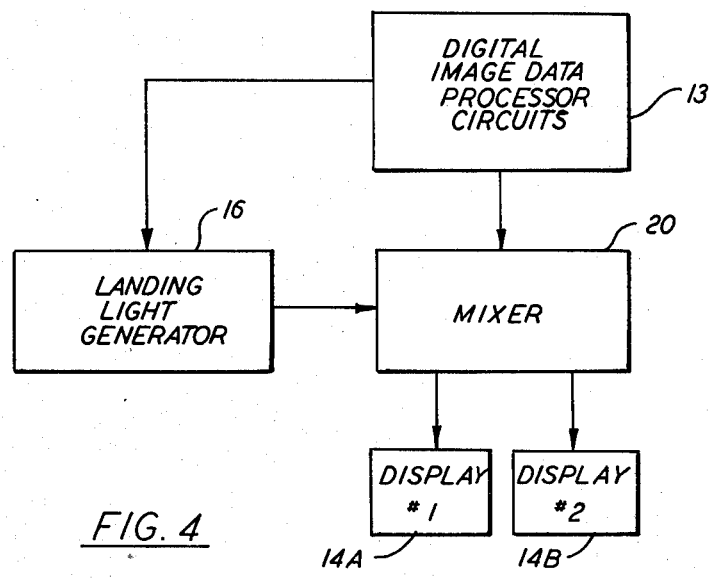
FIG. 4 is the right-hand portion of FIG. 3 to illustrate where the landing lights generator of the present invention is connected.

To relate the physical constants of Equation 1 more directly to the simulation, note that in the simulation the image is portrayed on a CRT or projection screen (FIG. 4). The ray angle below the horizon is proportional to the number of scanlines below the simulated horizon on the screen, assuming the display is scanned horizontally and there is an approximately horizontal horizon in the image. Consequently, the value of the sine function can be found digitally in the generator by accessing a memory incrementally, scanning down from the horizon. The scanline position of the horizon is provided by a computer which is conventionally included in the image data processing circuits.

The lamp intensity, P, is also a function of screen position. The landing light pattern is often like a spotlight, with a bright central beam falling off smoothly but rapidly in azimuth and elevation with respect to the lamp axis. If the lamp is fixed with respect to the eyepoint and the aircraft, the lamp pattern in azimuth and elevation will map directly to a pattern of P values fixed as a function of the scanline (elevation) and picture element along the scanline (azimuth). Conceptually, the lamp pattern could be stored for the screen, then looked-up and scaled by the h and sin(a) functions to generate I. In practice, the storage required for a 1000×1000 picture element display would be expensive, and, in addition, a lamp steering capability is desired so the pattern can be moved with respect to the screen.

The solution embodied in the present invention is to generate the pattern across each scanline based upon a limited number of parameters that are stored for each scanline. Thus, instead of having to store 1000 values of P for each 1000-pixel scanline, only five or fewer parameters are stored for each scanline. To use this technique, curve shapes must be found which are well adapted to modelling the azimuth patterns of lamp intensity, and which at the same time can be efficiently implemented in hardware.

Figure 7A:
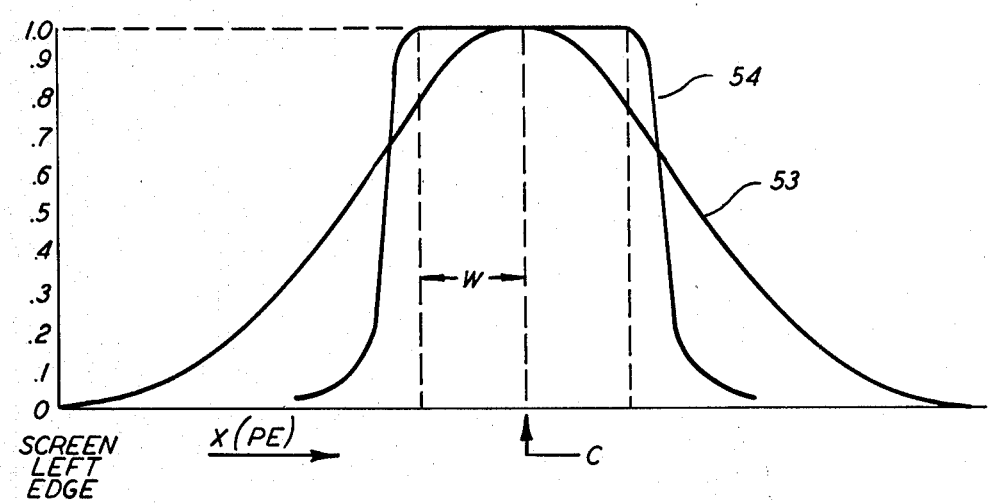
FIG. 7A is a graph of a bell-shaped curve superimposed upon the graph of an envelope curve developed in accordance with the present invention.

The curves selected are a bell curve and a derivative bell and envelope curve. Referring to FIG. 7, the bell curve 53 is so named because of the shape of its graph. Mathematically, the curve is given by $$P = I * 2^{-((x-C)/B)^2}$$

where I is the maximum value of the curve, x is the pixel coordinate being generated, C is the location of the center of the curve, and B is the shape factor. The smaller the value of B, the faster the curve falls off from its peak value.

For many practical simulations the bell curve will adequately represent the shape of the lamp pattern, so that only the values of I, C, and B are needed to generate the illumination pattern. Moreover, the location of the center of the curve may be adequately simulated as being the same for each scanline, in which case the value of C is a constant for the whole frame. Then only I and B need be stored for each scanline.

A more general pattern shape is generated by using an envelope curve 54 with the bell curve 53. The envelope curve is $2^{-((x-C+W)/E)^2}$ —for $x < C-W$
$1$ —for $C-W \leq x \leq C+W$
$2^{-((x-C-W)/E)^2}$ —for $x > C+W$, where x is the picture element (PE) count along the scanline.

The envelope curve is a bell curve modified so that it is constant over a central region $C-W \leq x \leq C+W$, but has the same fall-off starting at the edges of the region. The two parameters which control the envelope curve are W, which controls the width of the constant control region, and E, which determines the rate of fall-off. The location of C is shared with the bell curve. The envelope curve is scaled to a maximum value of one, so that when the product of the bell and envelope curves is taken to form a combined curve 55, the maximum value of the combined curve is still one.

The advantage of using an envelope curve in conjunction with the bell curve is that it provides more control of the light pattern fall-off near the edges of the pattern. Using the bell and envelope combination a lamp pattern may be simulated which has a relatively broad region of nearly uniform illumination, but with a rapid fall-off, determined by the envelope curve, near the edges. This type of pattern is useful for simulating the lights used on some aircrafts for taxiing.

Because the center of both the bell and envelope curves is determined by a single value C for the whole frame, the pattern may be steered in azimuth by varying C under computer control from the image data processing circuits. This is useful to simulate lamps which are attached to a steerable nose wheel which is under pilot control when taxiing. Also, because the values of I and the shape parameters B, E, and W are stored in a table as a function of scanline, a change in the starting point of the look-up sequence will accomplish steering in elevation. Having full control of azimuth and elevation pattern steering is especially useful for simulation of the lights on a helicopter, because helicopter lights may be fully steered under direct control of the crew.

Figure 8:
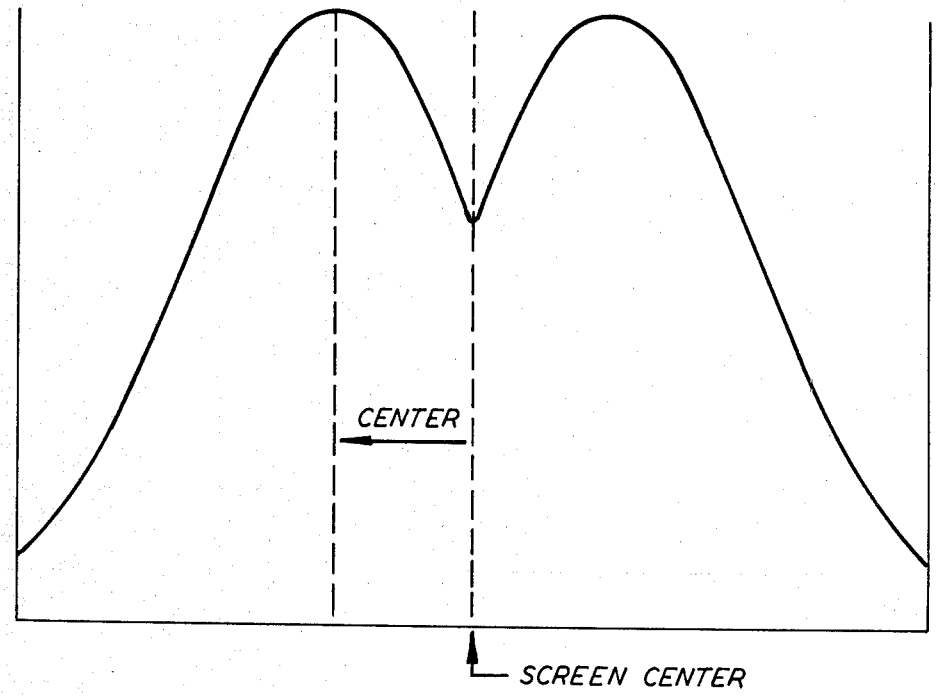
FIG. 8 is a graph of the twin lobe curve developed from the generator of the present invention.

Finally, there are some circumstances where a light pattern with two horizontal lobes may be useful, perhaps for aircraft with landing lights widely spaced on the two wings, or in simulations for a vehicle like an automobile with headlamps. This can be accomplished by generating a pattern which is symmetric about the center of the screen (FIG. 8). The pattern steering feature is not required at the same time as the dual lobe generation, so some economy is realized by using the C value to alternatively be used as the lobe position.

DETAILED DESCRIPTION OF THE PREFERRED EMBODIMENT

Figure 9:
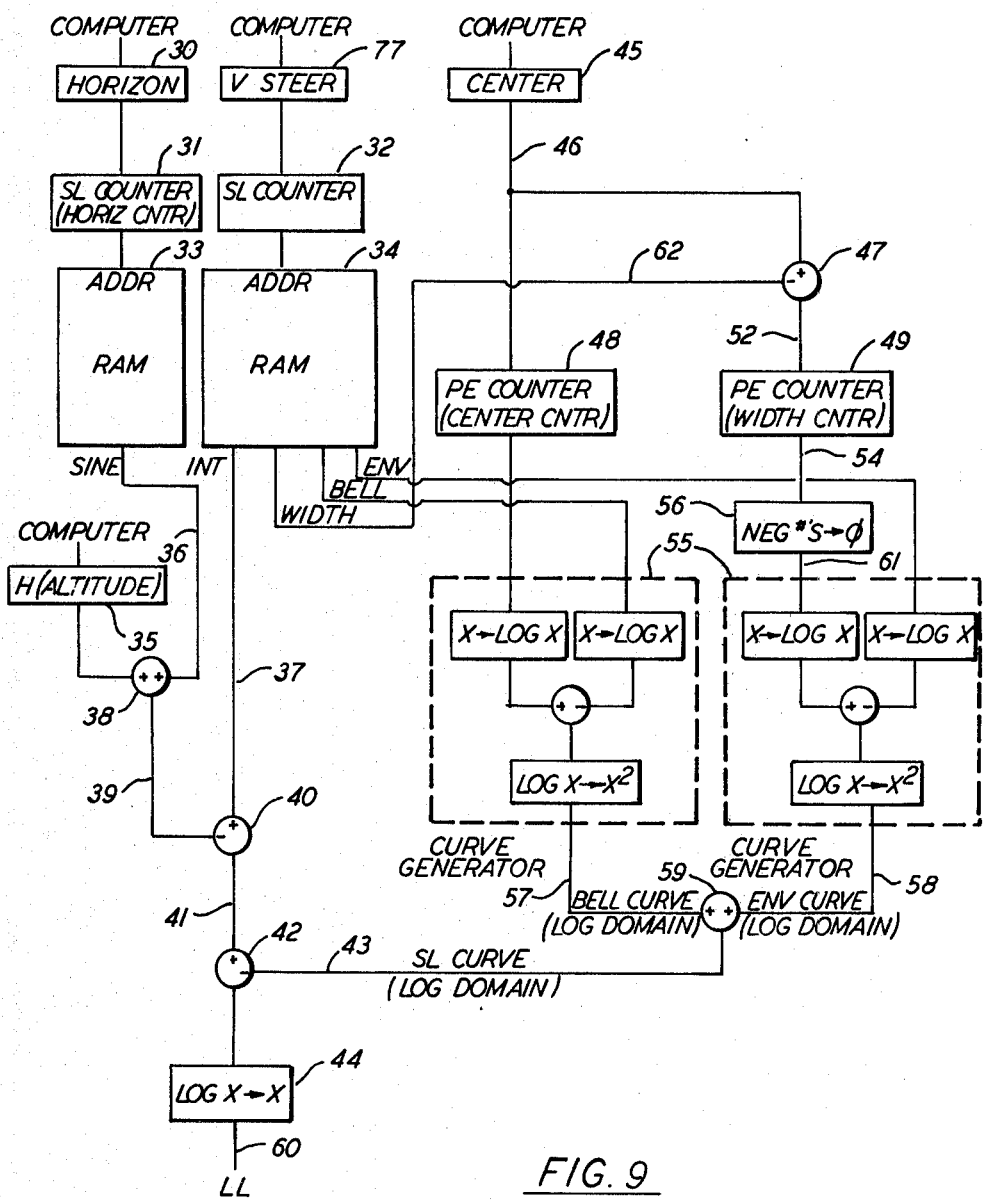
FIG. 9 is a circuit diagram, in block form, of the present function generator to create the landing lights effect in accordance with the present invention.

FIG. 9 is a circuit block diagram of the presently preferred form of this invention. Each data path in FIG. 9 transfers digital data words which may be several bits wide. All blocks in FIG. 9 are implemented with digital logic, such as the Motorola MECL 10,000 series of high speed emitter coupled logic. In order to minimize the amount of hardware, all multiplication operations are implemented by adding log domain variables; division operations by subtracting log variables. Base two logarithms are used for convenience of implementation with binary logic.

In the following discussion, names are given to digital signals which correspond to variables in the preceeding discussion of the theory of the invention. Thus, the digital signal CENTER corresponds to C, the position of the center of the pattern. Similarly, BELL corresponds to the bell shape B, ENV corresponds to the envelope shape E, WIDTH to the envelope width W, and INT to the logarithm of the maximum pattern intensity, I, on a scanline. However, the digital values are scaled to picture element and intensity factors appropriate to the particular system implementation. Note especially that the circuit signal H corresponds to the logarithm of altitude (h), and that each value stored in the SINE RAM is the negative logarithm of the corresponding sine-squared value of the depression angle a.

The two RAM (random access memory) blocks 33 and 34 are loaded with pattern data from the computer that is part of the image data processing circuits at the time the landing lights circuit is initialized. (The computer path to these RAMs is not shown.) Each addressable location of the memories 33 and 34 contain pattern parameters for one scanline.

The four registers 30, 35, 45, and 77 can be loaded from the computer during actual simulator operation. Register 30 is loaded with the two's complement negative value of the scanline number that coincides with the visual horizon. End-of-frame and end-of-line signals come from the image data processing circuits, marking the end of each generated image and the end of each scanline within the image, respectively. At each end-of-frame signal, the contents of register 30 initializes the horizon counter 31. The horizon counter increments each time an end-of-line signal is received. The output of the counter 31 addresses RAM 33 to yield a SINE value for each scanline. RAM 33 has been loaded with SINE values such that location 0 refers to the horizon scanline. When the output of horizon counter 31 is negative, this indicates that the current scanline is above the horizon, and so landing light intensity outputs are inhibited.

Register 77 is loaded with V STEER, a variable which controls the vertical steering of the pattern on the screen. Counter 32, a scanline counter, is initialized with V STEER each end-of-frame. V STEER is chosen so as to map the address 0 location of RAM 34 to a particular scanline on the screen. The output of the SL counter 32 addresses the RAM 34 as shown. Landing light intensity outputs are inhibited when the count from 32 is not in the range of RAM 34 addresses. The outputs of RAM 34 are the pattern parameters for the current scanline.

Register 35 is loaded with H, a variable which represents the altitude of the aircraft. Adder 38 adds H with SINE to generate an attenuation factor (log domain)

over data path 39. At subtractor 40 the sum of H and SINE is subtracted from INT, the unattenuated peak scanline intensity from RAM 34. The result 41 is constant for each scanline. Attenuation as a function of picture elements is provided by the SL curve over path 43.

Figure 12A:
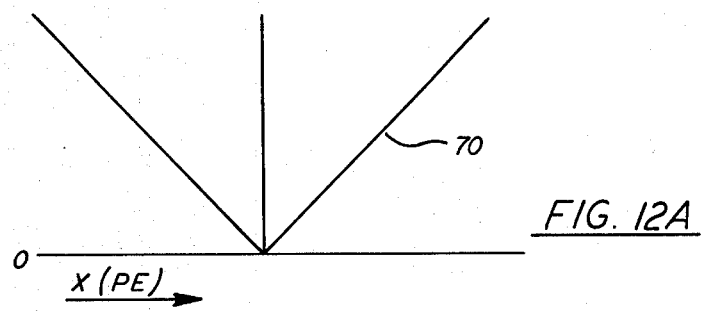
FIG. 12A is a graph of a pixel center counter output for generating a centered bell curve.
Figure 12B:
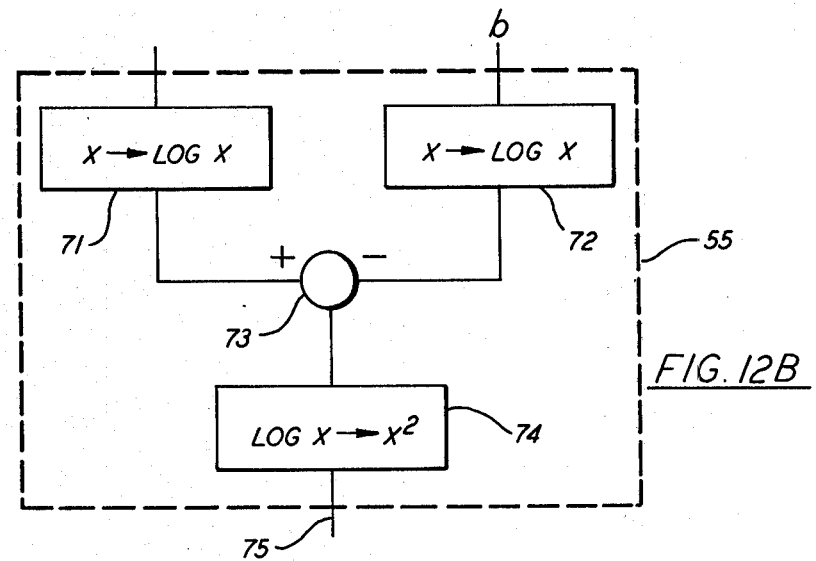
FIG. 12B is a representation of one curve generator, in accordance with the invention.

The SL curve over path 43 is generated using two identical curve generators 55. Refer to FIG. 12 for an explanation of the curve generator. This circuit is set up to generate variable-width, bell-shaped curves as a function of an input count. This is done by implementing the function of x:

$$\text{Bell curve} = 2^{-(x/b)^2}$$

where b is a constant which indicates the number of picture elements between the curve's peak and its half peak points. FIG. 12B depicts the implementation of this equation. In order to simplify the hardware, the circuit's input curve 70 (FIG. 12A) is the absolute value of x rather than x. This allows the use of log x in the calculations.

Figure 12C:
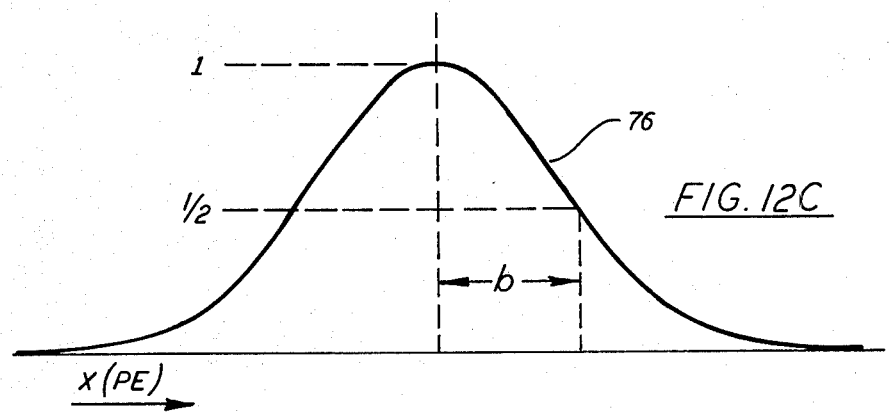
FIG. 12C is a symmetrical bell curve in accordance with the invention.

Log domain forms of the input count 70 and b are obtained from PROM tables 71 and 72. The difference between the two is taken by the subtractor 73. PROM table 74 gives a log x to x squared conversion. The result at point 75 is;

$$(x/b)^2$$

which is the inverted, log domain form of the desired curve 76 (FIG. 12C).

Two of these curve generators are shown in FIG. 9. The three variables WIDTH, BELL, and ENV for each scanline are obtained from RAM 34. BELL and ENV are routed to their respective curve generators over 50 and 51 as shown. They are constant for the entire scanline time.

Register 45 can be loaded from the computer any time during simulator operation. It contains CENTER, the horizontal steering variable. CENTER is the picture element at which the center of the bell and envelope curves will occur (refer to FIG. 7A).

Figure 10:
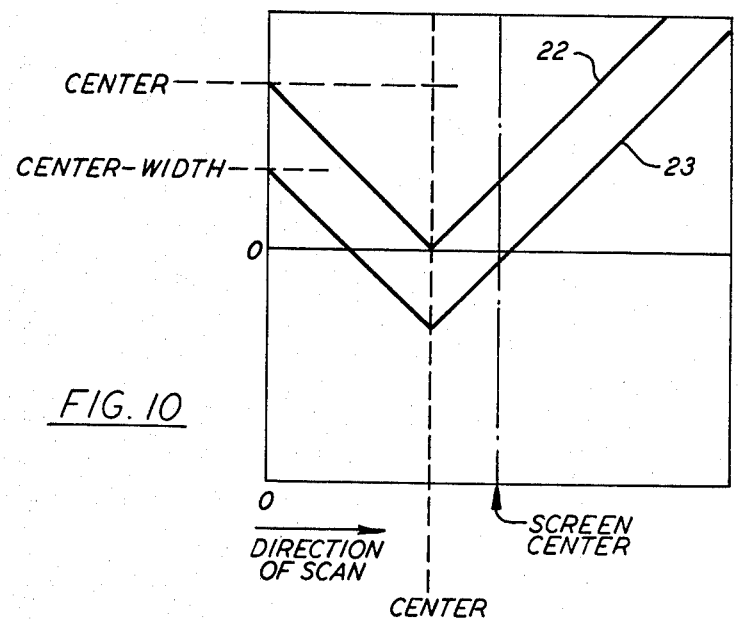
FIG. 10 depicts the outputs of the pixel center counter and width counter of FIG. 9, illustrating steering in accordance with the invention.
Figure 11:
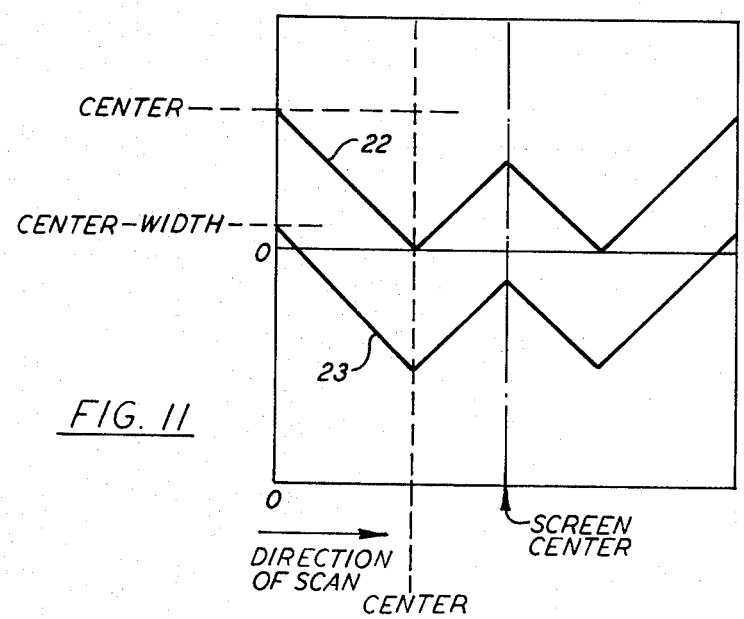
FIG. 11 is a curve similar to FIG. 10 but for the formation of a two lobe pattern.

Picture element counters 48 and 49 provide the input counts to the curve generators. Examples of the values at 53 and 54 are shown in FIGS. 10 and 11. The output of the center counter is 22, and the output of the width counter is 23. The counters are initialized at end-of-line time; center counter 48 with CENTER, and width counter 49 with CENTER-WIDTH. WIDTH is the number of picture elements from CENTER at which the envelope curve peaks at one. As the scanline time begins, both counters count down at the picture element rate. When the center counter reaches zero, it causes a reversal of count of both itself and the width counter. If a single lobe pattern has been indicated by the computer, the counters continue their up count for the remainder of the scanline as shown in FIG. 10. If a double lobe pattern has been indicated, both counters reverse their direction of count at the screen center as shown in FIG. 11.

Figure 7B:
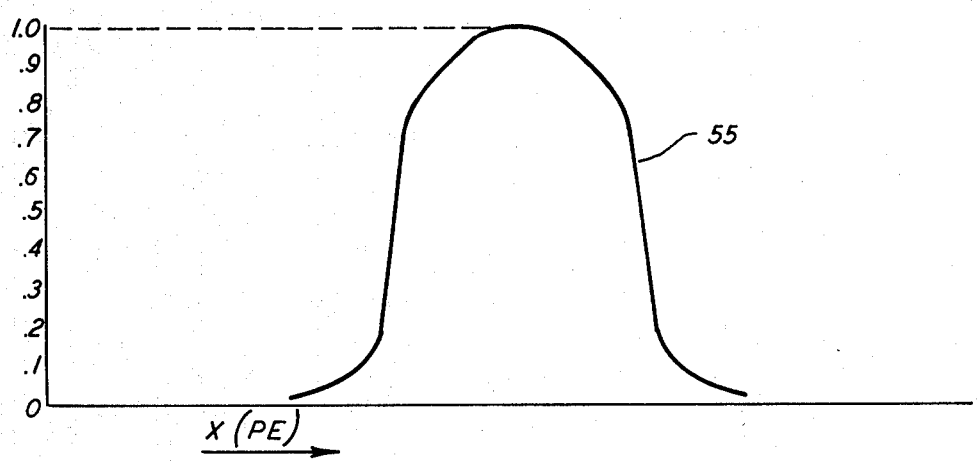
FIG. 7B is a graph of the product curve which results from the multiplication of the points in the FIG. 7A curves.

Referring to FIG. 9, the width counter's output at 54 is taken through the function at 56 in order to clamp all negative values to zero. The center counter's output at 53 does not need such a function since it can never be negative. The curve generators 55 then produce the bell and envelope curves at 57 and 58 respectively. Refer to FIG. 7 for examples of both curves in the linear domain; 53 is a bell curve and 54 is an envelope curve. Adder 59 (FIG. 9) produces the inverted, log domain SL curve. The linear domain SL curve is 55 in FIG. 7B.

The SL curve attenuates the peak scanline intensity at 41 through the subtractor 42. The result is converted to the linear domain by PROM table 44. At point 60 the curve 21 of FIG. 1B has been generated.

I claim:

1. A system for developing a predetermined scene from information obtained from data generated digitally and from data stored electronically, and for displaying said scenes on a display device, comprising:
    data storage means for receiving data representative of predetermined scenes,
    control means for generating data in order to select a predetermined scene,
    a display device connected to receive data from said data storage means and to display scenes selected by said control means,
    means connected to said display device to vary the illumination intensity of portions of said displayed scene in accordance with a preselected pattern unrelated to the information in said scene,
    an aircraft simulator apparatus having portions to develop information varying in accordance with input provided by a pilot trainee,
    a computer-controller circuit,
    digital image data processor circuit controlled by information from said computer-controller circuit,
    landing lights function generator circuit means comprising counter means connected to said computer-controller circuit to initiate counting depending upon data from said computer-controller circuit,
    circuit means to convert the output of said counter circuit means to a log function, and
    circuit means to combine said log function output with a position signal from said aircraft simulator in order to control the timing position of said log function output.

2. A system for developing a predetermined scene as set forth in claim 1 wherein said preselected pattern is in a form to simulate an increase in intensity of illumination as would be viewed by a spotlight directed on said scene.

3. A system for developing a predetermined scene as set forth in claim 2 wherein said spotlight is in the form of an aircraft landing light.

4. A system for developing a predetermined scene as set forth in claim 1 wherein said intensity of portions of said scene is varied in accordance with a curve initiated by said counter means.

5. A system for developing a predetermined scene as set forth in claim 4 wherein said curve output of said counter means is in accordance with the position of the steering of said aircraft simulator.

6. A system for developing a predetermined scene as set forth in claim 1 wherein said illumination intensity is in the form of a two lobed pattern obtained by resetting said counter means.

7. A system for developing a predermined scene as set forth in claim 1 wherein said output of said counter circuit means is in the form of a bell shaped pattern, circuit means responsive to said counter circuit means to develop an output pattern having a predetermined configuration, circuit means to combine said bell shaped pattern with said output pattern to form a composite shaped pattern, circuit means to adjust the timing position of said shaped pattern in accordance with position data from said aircraft simulator, and mixer circuit means to increase said illumination intensity on each scanline in accordance with said shaped pattern.

* * * * *